Sept. 22, 1964

H. H. BIVINS 3,149,477

VEGETABLE PRODUCE COOLER

Filed Jan. 29, 1963

INVENTOR.
HENRY H. BIVINS
BY
*Eckhoff & Slick*
ATTORNEYS

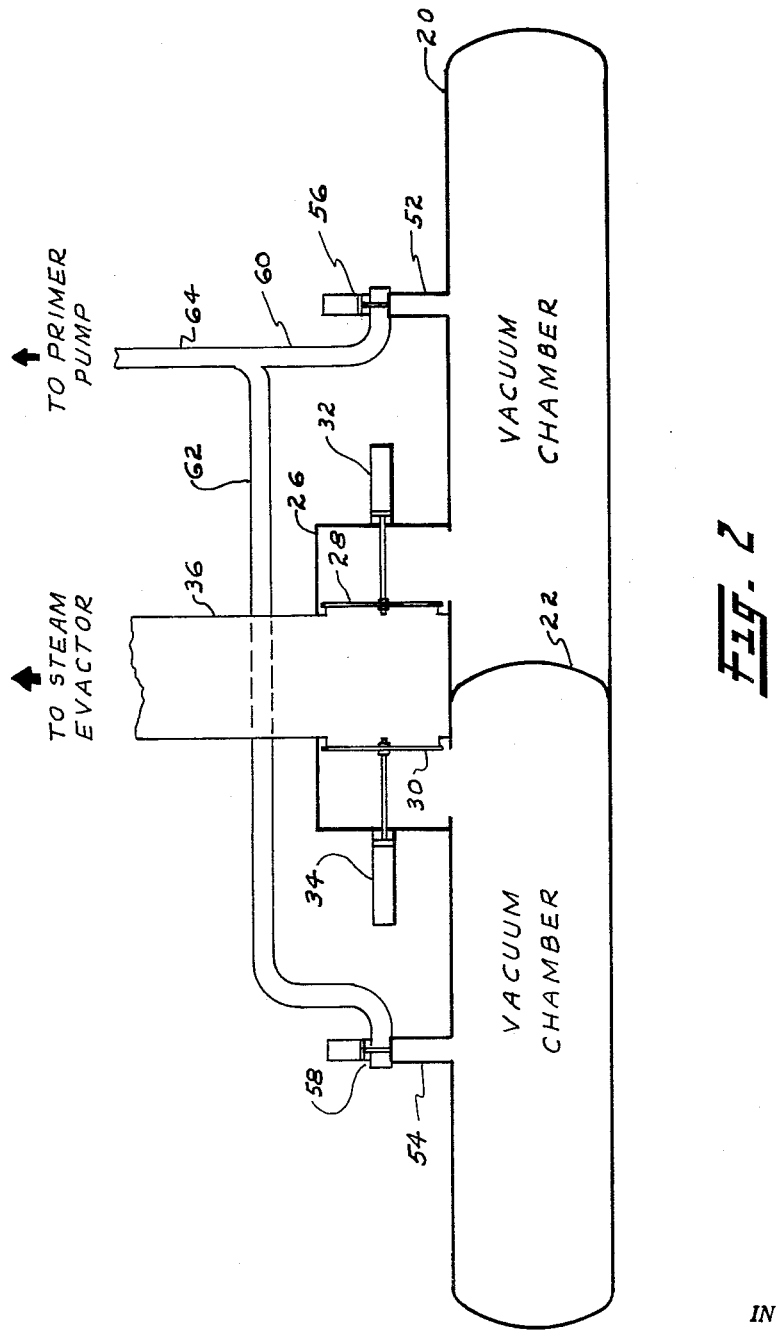

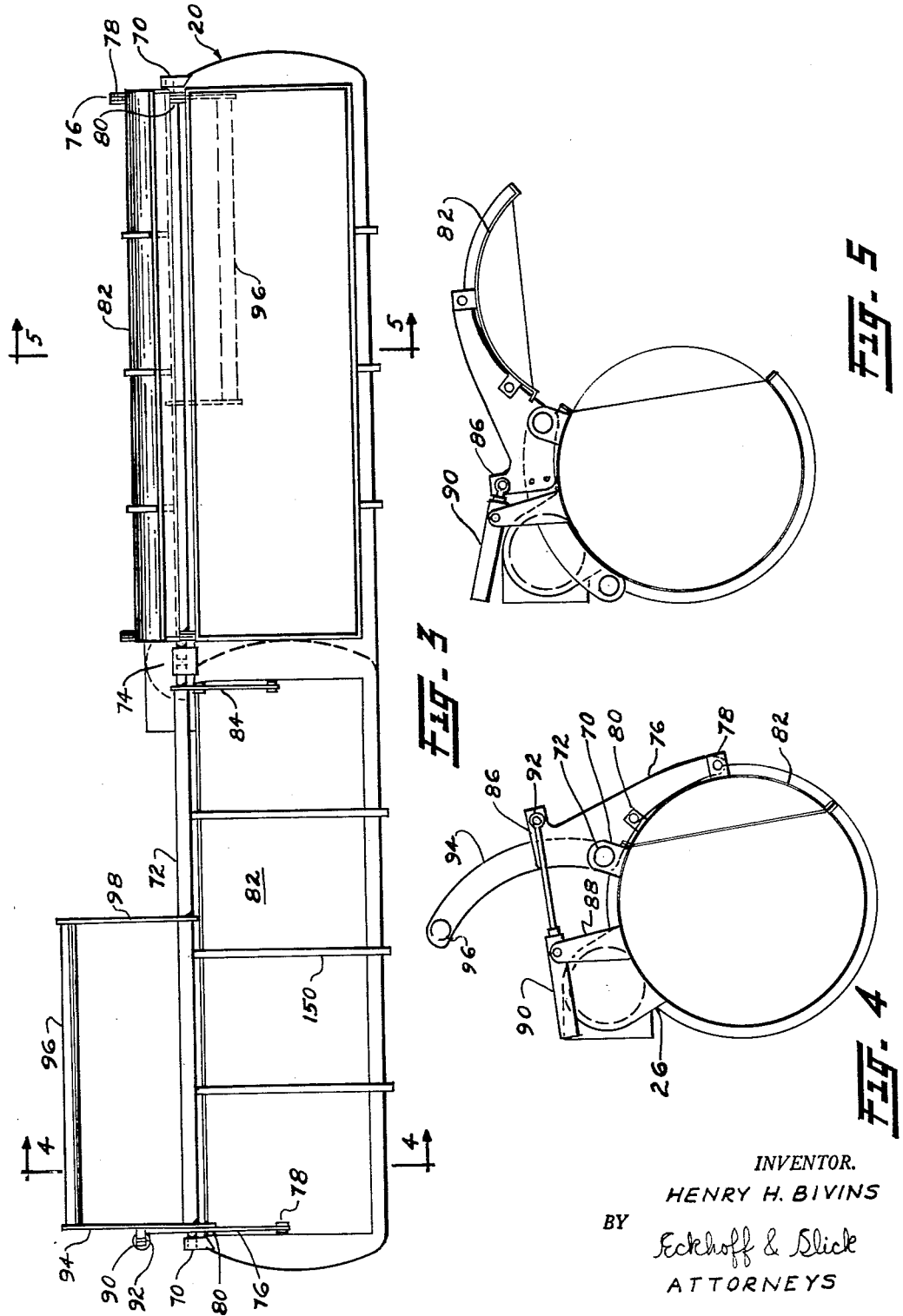

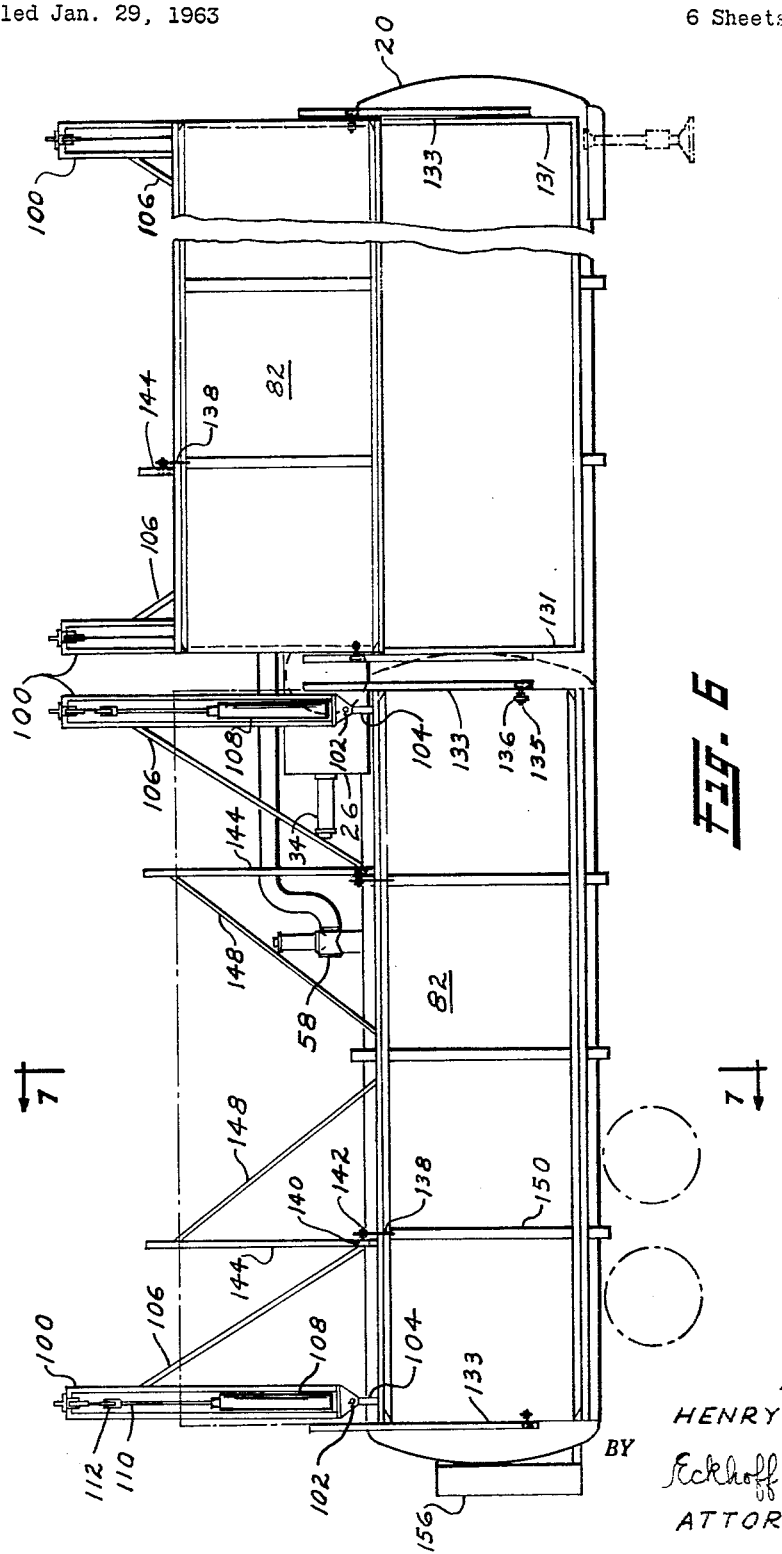

Sept. 22, 1964    H. H. BIVINS    3,149,477
VEGETABLE PRODUCE COOLER
Filed Jan. 29, 1963    6 Sheets-Sheet 5

INVENTOR.
HENRY H. BIVINS
BY Eckhoff & Slick
ATTORNEYS

United States Patent Office 3,149,477
Patented Sept. 22, 1964

3,149,477
VEGETABLE PRODUCE COOLER
Henry H. Bivins, 313 Green Valley Road,
Watsonville, Calif.
Filed Jan. 29, 1963, Ser. No. 254,659
2 Claims. (Cl. 62—268)

This invention relates in general to apparatus for pre-cooling produce prior to shipment and particularly to vacuum cooling apparatus which facilitates entry of the produce to be cooled into the tank in which the vacuum is drawn.

In conventional large-scale vacuum cooling apparatus which are often transported by rail or truck from place to place and used to cool produce, especially lettuce and other leafy vegetables, by sujecting the produce to a vacuum with or without the presence of added moisture, it is necessary to utilize a relatively complex and slow-moving system for introducing the produce into the cooling chamber. This is true because of the structure of such cooling chambers, which resemble railroad tank cars. These are provided with an opening at one end or the other into which a conveyor may be advanced. The conveyors usually form a part of the apparatus and must be shipped from place to place with the tank. Further, the loading of an end-loading vacuum tube by means of a conveyor makes the transfer of produce from trucks to the tank interior a relatively complex matter, it being necessary for forklift trucks to be used to unload the produce from the truck and place it on a conveyor, and the conveyor thereafter removed from the interior of the vacuum tube.

It is an object of this invention to provide a cylindrical vacuum chamber which can be loaded or unloaded directly by one trip of a giant lift truck; the truck should be capable of carrying a load comprising five pallets directly from a truck to the vacuum chamber and from the chamber back to a truck, thus to eliminate much handling which has heretofore been necessary.

It is another object of this invention to provide a double chamber vacuum cooler which is constructed so as to utilize a single evacuating means whereby one portion of the chamber may be subjected to a vacuum while another portion is being opened to receive or discharge produce.

Yet another object of this invention is to provide a cylindrical vacuum cooler having a door constituting a substantial fraction of the entire cylinder, which door, when in a closed position, is urged into an air-tight position in part through the action of atmospheric pressure.

Further objects and advantages of this invention, if not specifically set forth, will become apparent during the course of the description which follows.

Generally, this invention comprises a vacuum cooling apparatus for produce and especially for leafy vegetables comprising an elongated cylindrical chamber of hermetic construction, the chamber being provided with its major axis extending horizontally and, unlike chambers available heretofore, having a fixed circular closure at either end thereof. The opening required for the ingress and egress of produce is in the side wall of the chamber and extends substantially the entire length of the chamber while encompassing a radial distance of at least about 45° and less than 180°. There is provided a door extending between the ends of this opening which, when in a closed position, constitutes a smooth continuation of the cylindrical chamber wall. Counterweighted means or hydraulic cylinders are provided for moving the door between a first position in which the door completes the hermetic closure of the chamber and a second position in which the door is spaced from the chamber and is preferably immediately above the entrance-way therefor to permit loading of the chamber with produce through the said opening in the side wall. The chamber is also provided with conventional air and moisture evacuation apparatus, including, preferably, a three-stage steam ejector.

In the drawings:

FIGURE 2 is a schematic representation of the dual vacuum cooling apparatus showing the manner in which a single one of the chambers may be evacuated while another is open to the atmosphere.

FIGURE 3 is a side elevational view of the vacuum chamber structure of this invention, particularly showing the novel door arrangement.

FIGURES 4 and 5 are end elevational views through lines 4—4 and 5—5 of FIGURE 3.

FIGURE 6 is a side elevational view of a somewhat different structure similar to that of FIGURE 3 excepting having a different door opening means.

Figure 7:
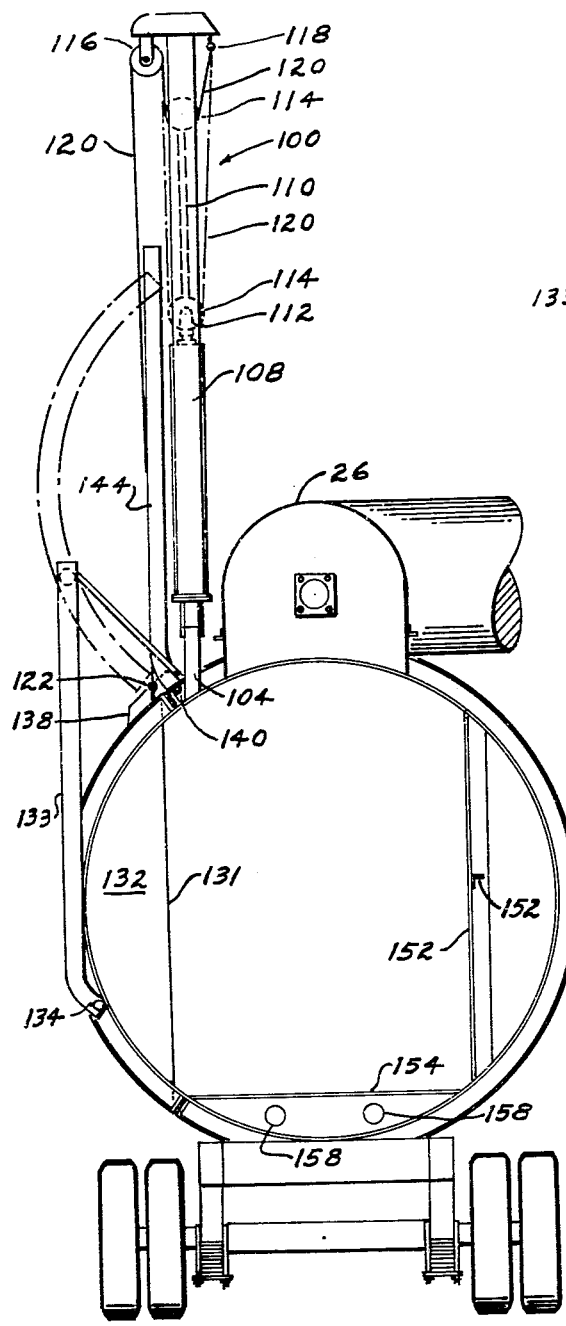

FIGURE 7 is an enlarged sectional view on the line 7—7 of FIGURE 6.

Figure 8:
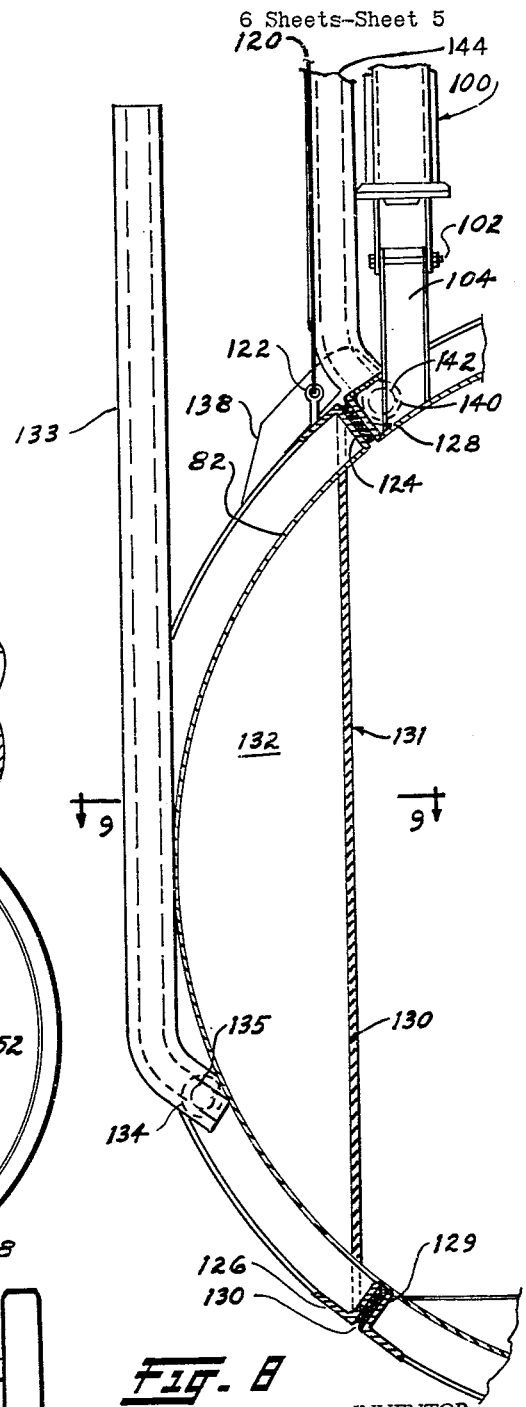

FIGURE 8 is an enlarged fragmentary view of a portion of FIGURE 7.

Figure 9:
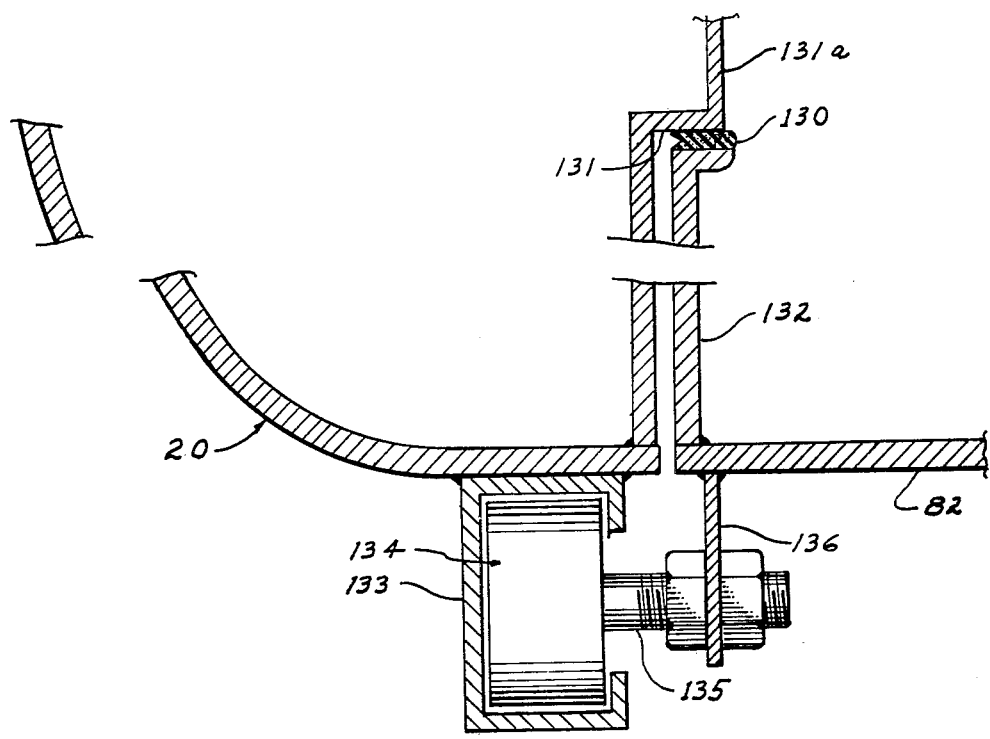

FIGURE 9 is an enlarged fragmentary plan view along line 9—9 of FIGURE 8.

Referring now to the drawings wherein like characters refer to like parts throughout, there is shown a vacuum chamber system 20 divided into two sections of about equal size by an intermediate bulkhead 22. Each of the halves is provided with a separate door 24, a portion of which may be seen in FIGURE 1, which door extends essentially the entire length of each of the chambers. Each door, when in place, constitutes a smooth continuation of the cylindrical tank wall. When open, each door reveals an opening constituting at least 45° and something less than 180° of the radial distance about cylindrical structure 20. As shown in FIGURES 3 and 6, which are side elevations of different modifications of the structure of FIGURE 1, the doors are mounted so as to provide an opening into which large quantities of produce may be inserted by means of a giant lift truck, for example one capable of simultaneously placing five pallets of produce packages directly into a vacuum chamber. Vacuum header 26 is in communication with the interior of each of the halves of the chamber, as shown in FIGURE 2, and there is provided means for permitting a vacuum to be applied to the interior of each of the chambers individually. Specifically, internally of the header there is provided a pair of valves 28 and 30 mounted on hydraulic cylinder assemblies 32 and 34, each of which are separately controllable (by means not shown) whereby to permit the application of a vacuum either to the left or right side of the tank while one or another of the valves 28 or 30 is in a closed position. Line 36 leads to means for producing a high vacuum such as a conventional three-stage steam ejector of the type commonly used with end-loading produce vacuum chambers. Supplementing the steam ejector 38 with its associated boiler 40, condenser 42, second evactor 44, intermediate condenser 46, and first evactor 48, as well as the condensation apparatus 50, are lines 52 and 54 which are provided with hydraulically operated valves 56 and 58 and connect with conduits 60 and 62 to common conduit 64 which leads to the primer pump, not shown. The primer pump is used to evacuate air from the vacuum chambers immediately after closing a door, and effectively removes quantities of air from the chamber only while atmospheric pressure or a relatively mild vacuum prevails therein.

One embodiment of the invention is shown in FIGURE 3 in side elevation and in FIGURES 4 and 5 in end elevation. As is seen there, the dual chamber 20 has integral bearing blocks 70 which support one end of each of shafts 72, the other end of each of which is supported by double bearings in the bearing block 74. Fixedly secured to the shafts 72 are the arcuate hinges 76 to which are secured brackets 78 and 80 which are integral with each of the doors 82. The hinge members 84 seen at the centermost portion of FIGURE 3 which are intermediate the ends of the dual chambered tank are similarly constructed and secured to the doors 82 and pivotally mounted on shaft 72, but lack the lever ends 86 which are integral with the hinges 76. Mounted on brackets 88 at either end of the tank are hydraulic cylinder assemblies 90. The distal ends of the piston rods 92 are pivotally secured to the lever ends 86. Also pivotally mounted to shaft 72 are the arcuate supports 94 which are suitably bolted to hinge members 76 so as to move therewith. The supports 94 each support one end of a counterweight 96 which is supported at the other end thereof by a second arcuate bracket 98, also pivotally mounted on shaft 72. The counter-weight 96 is essentially equivalent in weight to the door 82 so that when the hydraulic cylinder retracts the door into the position shown in FIGURE 5, there will be no tendency for the door 82 to fall closed, thereby possibly endangering workers should the hydraulic system for assembly 90 fail.

The modification of FIGURES 6–8 also permits the entire front of each of the individual vacuum chambers to be removed, but the doors open and close in a somewhat different fashion. The doors 82 are not hinged, but rather are lifted forwardly away from the tank section and then upwardly through the operation of a hydraulic cylinder and pulley arrangement. Each of the tank sections having a door therefor is provided with two pulley-supporting frames 100 which are pivoted at 102 to outstanding pedestals 104, each of which are mounted on the top of the tank 20. When in use and in the position shown in FIGURE 6, struts 106 are bolted to brackets on the tank's upper surface and to the pulley frame 100. Mounted at the base of each of the frames is an hydraulic cylinder 108 and secured to each piston rod 110 thereof is clevis 112, to which is rotatably mounted the pulley 114. In FIGURE 7, the piston rod, clevis and pulley are shown in two different positions so as to illustrate the action of the mechanism. Pulleys 116 are rotatably mounted at the top of frames 100 and eye bolts 118 provide anchors for cables 120, each of which is reaved about pulleys 114 and 116 and is anchored at the other end thereof to eye 122 which is in turn secured to a length of angle iron 124, one of which extends the entire length of each of the doors 82. Similarly, there is provided a reinforcing angle iron length 126 which extends the length of the door at its lowermost edge. Angle irons 124 and 126 provide reinforcement for the edges of the double walled doors. Similarly, the double walled chambers are reinforced by means of longitudinally extending angle irons 128 and 129 at points where the angle irons 124 and 126 abut. Gasket 130 is secured about the lip of the opening formed when a door 82 is removed, and is bonded to the angle irons 124 and 126 as well as to the door-mounted flanges opposed to the shoulders 131 of the opposed upright bulkheads 131a at either end of each chamber. Each door has at either end a flanged plate 132, each of which is a segment of a circle and presents a straight vertical surface on which is mounted a portion of gasket 130. Gasket 130 is attached to the door, thus permitting it to be moved out of a position where it might be injured by the lift truck fork tips. The V-shaped leading edge of the gasket further assures a tight seal, as any air leaking will cause the elastomer material to flare.

To provide means for guiding the door of the embodiment of FIGURE 6 from a closed to an open position and back again, there is provided a pair of U-shaped tracks 133 at either end of each chamber. Each of these tracks 133 has riding therein a roller 134 mounted on shaft 135, in turn held by bracket 136 fixed to the door 82. The upper end of each door has an L-shaped bracket 138 which also supports an additional roller 140 mounted on shaft 142. This roller rides in the tracks 144, two of which, braced by struts 148, are mounted intermediate the ends of each of the doors and are secured to the cylindrical exterior surfaces of the tank at points directly above the upper lips of the door opening. As in the case of struts 106, the bolts may be removed at either end so as to permit the tracks 144 to be pivoted downwardly to rest upon the upper surfaces of the tank.

As in conventional tanks of this sort, suitable ribs 150 may be provided for stiffening purposes, as well as interior stikeners 152. The floor 154 is perforated and a control panel 156 is required for the various mechanisms which must be actuated if it is desired to tilt or lift the door or doors. Pipes 158 may also be placed beneath the interior floor 154 which exhaust to the atmosphere so as to provide means for permitting the entrance of air at the conclusion of the cooling operation. The entire unit is preferably mounted on a vehicle chassis.

In operation, considering the embodiment of FIGURES 3–5, retraction of the piston rod of cylinder 90 causes the door to pivot in bearing block 70 so that the entire door is opened, as shown in FIGURE 5. This, of course, can take place only after sufficient air is admitted to the chamber to approximate atmospheric pressure. Referring to FIGURE 2, if the left-hand door is closed, the valve 58 is positioned so that air may be exhausted to the extent of the capacity of the primer pump. Thereafter, this valve is closed and valve 30 opened through the action of cylinder 32 and the three-stage steam evactor reduces the gas pressure within the chamber to the desired level. Usually, to facilitate cooling, the produce, especially lettuce, is moist when placed in the chamber and the flashing of moisture from the produce provides the cooling effect. At the conclusion of the cooling operation as determined by thermocouples inserted in the cartons of produce, the valves are all closed and air admitted to the interior of the chamber, following which time the one door is opened and the opposite door closed. In the embodiment shown in FIGURES 6–9, the method of operation is similar in that alternate evacuation of the chambers permits the primer and evacuator system to continue in operation continuously. When the piston rods 110 of cylinders 108 are retracted, the door 82 is lifted on its tracks 133 and 144, first outwardly and then upwardly until it assumes the position shown in phantom view in FIGURE 7.

Figure 1:
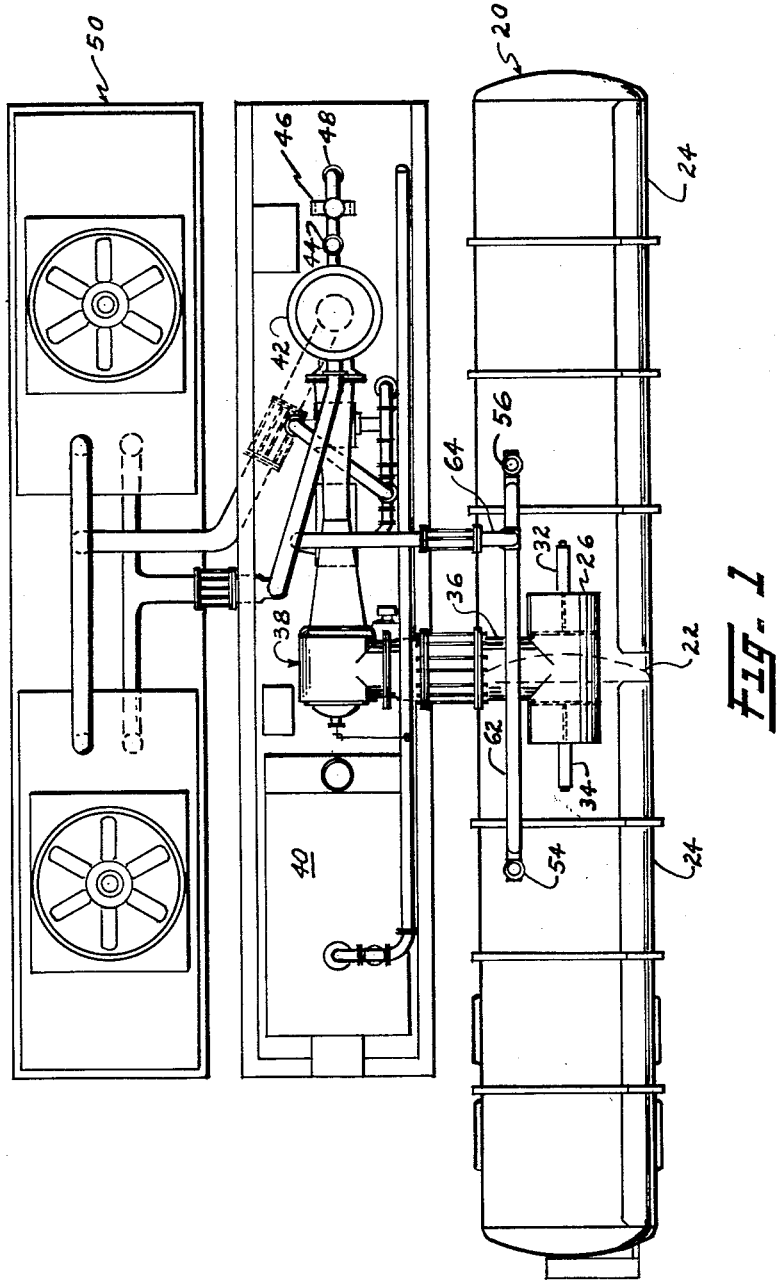
FIGURE 1 is a plan view of a dual chamber vacuum cooler showing associated steam ejectors and condensation apparatus.

In addition to the unit itself, the only other equipment needed in the loading operation is a five-pallet fork lift, thus eliminating the conveyor conventionally used for end loading. In practice, lettuce placed in the cooling chamber is cooled in 10 to 12 minutes, with the temperature of the lettuce dropping from 32–34°. This means that under continuous operation the dual cooler described has a capacity of 1 to 1½ rail cars per hour. The overall structure shown in FIGURE 1 is constructed for quick separation of the three parallel units shown, so that each may be transported separately.

In the foregoing description, various leads for the hydraulic cylinders, controls therefor, etc., have not been shown, as these are conventional.

Obviously, many modifications and variations may be made without departing from the spirit and scope of this invention, and therefore only such limitations should be imposed as are indicated in the appended claims. For example, in addition to the means shown for supporting the doors and moving them from open to closed positions, it is also possible to utilize an hydraulic cylinder system where the doors are directly supported by the piston rods rather than using a system of pulleys in addition to the hydraulic cylinder system, as shown in FIGURE 6.

I claim:
1. A vacuum refrigeration apparatus for vegetable produce comprising an elongated cylindrical chamber of hermetic construction;
   (a) means supporting said chamber with its major axis extending horizontally;
   (b) a fixed closure at either end of the said chamber;
   (c) an opening in the side wall of said chamber extending essentially from one end of said chamber to the other intermediate the said fixed closures at either end thereof;
   (d) a door extending between the said ends of the said chamber covering the entire side wall thereof when in place on the said chamber over the said opening;
   (e) means supporting said door for movement between a first position in which said door completes the hermetic closure of said chamber and a second position in which said door is spaced from said chamber to permit loading of said chamber with produce through said opening in the said side wall, said means comprising upstanding frames mounted to said chamber at either end of said door and above said door, said frames having lines secured thereto extending from the top of said frames to the said door for lifting said door upwardly, said means including at least a single pair of vertically extending guides secured to each end of said chamber, one guide of each pair of said guides being mounted above the other of said guides of said pair, and means slidably connecting said door and the said guides whereby said door may be lifted upwardly by means of the said lines and guided by means of the said guides; and
   (f) means for evacuating gas from the interior of the said chamber when the said door is in said first position.

2. A vacuum refrigeration apparatus for vegetable produce comprising an elongated cylindrical chamber of hermetic construction;
   (a) means supporting said chamber with its major axis extending horizontally;
   (b) a fixed closure at either end of the said chamber;
   (c) an opening in the side wall of said chamber extending essentially from one end of said chamber to the other intermediate the said fixed closures at either end thereof;
   (d) a door extending between the said ends of the said chamber covering the entire side wall thereof when in place on the said chamber over the said opening;
   (e) means supporting said door for movement between a first position in which said door completes the hermetic closure of said chamber and a second position in which said door is spaced from said chamber to permit loading of said chamber with produce through said opening in the said side wall, said means comprising an hydraulic cylinder system for opening and closing said door by lifting said door above said opening and returning said door to a closed position said means including a pair of upstanding frames collapsibly mounted at either end of said door to the said chamber and above the said door, said frames having cables extending from the top thereof and secured to the said door, each of the said cables being secured to a piston of said hydraulic cylinder system whereby to provide means for lifting the said door upwardly, said means including at least a single pair of channel-shaped guides secured to each end of said chamber, one guide of each pair of said guides being mounted above the other of said guides of said pair, said means including rollers rotatably mounted on the said door at either end thereof and riding in the said guides whereby to provide means for lifting the said door above the said chamber and for guiding the said door as it is being lifted; and
   (f) means for evacuating gas from the interior of the said chamber when the said door is in said first position.

References Cited in the file of this patent
UNITED STATES PATENTS

| | | |
|---|---|---|
| 1,299,618 | Robison | Apr. 8, 1919 |
| 1,549,027 | Perry | Aug. 11, 1925 |
| 2,126,426 | Traube | Aug. 9, 1938 |
| 2,533,423 | Bunch | Dec. 12, 1950 |
| 2,880,523 | Overton | Apr. 7, 1959 |